United States Patent
Weksler et al.

(10) Patent No.: US 10,349,117 B2
(45) Date of Patent: Jul. 9, 2019

(54) MEDIA REMOVAL AFTER CONSUMPTION

(71) Applicant: Lenovo (Singapore) Pte. Ltd., Singapore (SG)

(72) Inventors: Arnold S. Weksler, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/180,962

(22) Filed: Jun. 13, 2016

(65) Prior Publication Data

US 2017/0359615 A1 Dec. 14, 2017

(51) Int. Cl.
| | | |
|---|---|---|
| *H04H 60/45* | (2008.01) |
| *H04N 21/4335* | (2011.01) |
| *H04N 21/442* | (2011.01) |
| *H04N 21/45* | (2011.01) |
| *H04N 21/475* | (2011.01) |
| *H04N 21/4415* | (2011.01) |
| *H04N 21/488* | (2011.01) |

(52) U.S. Cl.
CPC ..... *H04N 21/4335* (2013.01); *H04N 21/4415* (2013.01); *H04N 21/44204* (2013.01); *H04N 21/4532* (2013.01); *H04N 21/475* (2013.01); *H04N 21/4882* (2013.01)

(58) Field of Classification Search
CPC combination set(s) only.
See application file for complete search history.

(56) References Cited

U.S. PATENT DOCUMENTS

| | | | |
|---|---|---|---|
| 7,519,627 B2* | 4/2009 | Malloy | H04N 21/4334 |
| 2005/0273827 A1* | 12/2005 | Javed | H04N 7/17336 |
| | | | 725/90 |
| 2009/0178093 A1* | 7/2009 | Mitsuji | H04N 7/1675 |
| | | | 725/104 |
| 2012/0324489 A1* | 12/2012 | Greenfield | H04N 21/4335 |
| | | | 725/9 |
| 2013/0034342 A1* | 2/2013 | Ueno | G11B 27/034 |
| | | | 386/295 |
| 2016/0029057 A1* | 1/2016 | Wickenkamp | H04N 21/252 |
| | | | 725/14 |
| 2016/0234595 A1* | 8/2016 | Goran | H04R 3/002 |

* cited by examiner

*Primary Examiner* — Mulugeta Mengesha
(74) *Attorney, Agent, or Firm* — Ference & Associates LLC

(57) ABSTRACT

One embodiment provides a method including: associating, using a processor, at least one consumer with identified media; determining, using a processor, the at least one consumer has consumed the identified media; and removing, based upon all associated consumers consuming the identified media, the identified media. Other aspects are described and claimed.

21 Claims, 3 Drawing Sheets

MEDIA REMOVAL AFTER CONSUMPTION

BACKGROUND

Information handling devices (e.g., tablets, laptop computers, smart TVs, smart phones, TVs, etc.) allow consumers of media (e.g., music, television shows, movies, videos, etc.) to consume the media in many different locations. Additionally, digital video recorders (DVRs) and streaming media services allow users to consume the media at times other than when the media originally aired. For example, a television show may air at 8:00 p.m. on a Thursday night, but the consumer may record the show on a DVR and watch it at a different time. Additionally, because the show has been recorded, multiple consumers can watch the shows at different times. For example, one person may watch the recorded show on Friday night and another person in the same household may watch the recorded show on Saturday. Streaming media services provide similar flexibility in that a show may be placed on a favorite or must watch list that a user can access later to consume the media.

BRIEF SUMMARY

In summary, one aspect provides a method, comprising: associating, using a processor, at least one consumer with identified media; determining, using a processor, the at least one consumer has consumed the identified media; and removing, based upon all associated consumers consuming the identified media, the identified media.

Another aspect provides an information handling device, comprising: a processor; a memory device that stores instructions executable by the processor to: associate at least one consumer with identified media; determine the at least one consumer has consumed the identified media; and remove, based upon all associated consumers consuming the identified media, the identified media.

A further aspect provides a product, comprising: a storage device that stores code, the code being executable by a processor and comprising: code that associates at least one consumer with identified media; code that determines the at least one consumer has consumed the identified media; and code that removes, based upon all associated consumers consuming the identified media, the identified media.

A further aspect provides an information handling device, comprising: a processor; a memory device that stores instructions executable by the processor to: associate a plurality of consumers with identified media; determine at least one of the plurality of consumers has consumed the identified media; and modify, based upon the at least one of the plurality of consumers consuming the identified media, a characteristic associated with the identified media.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
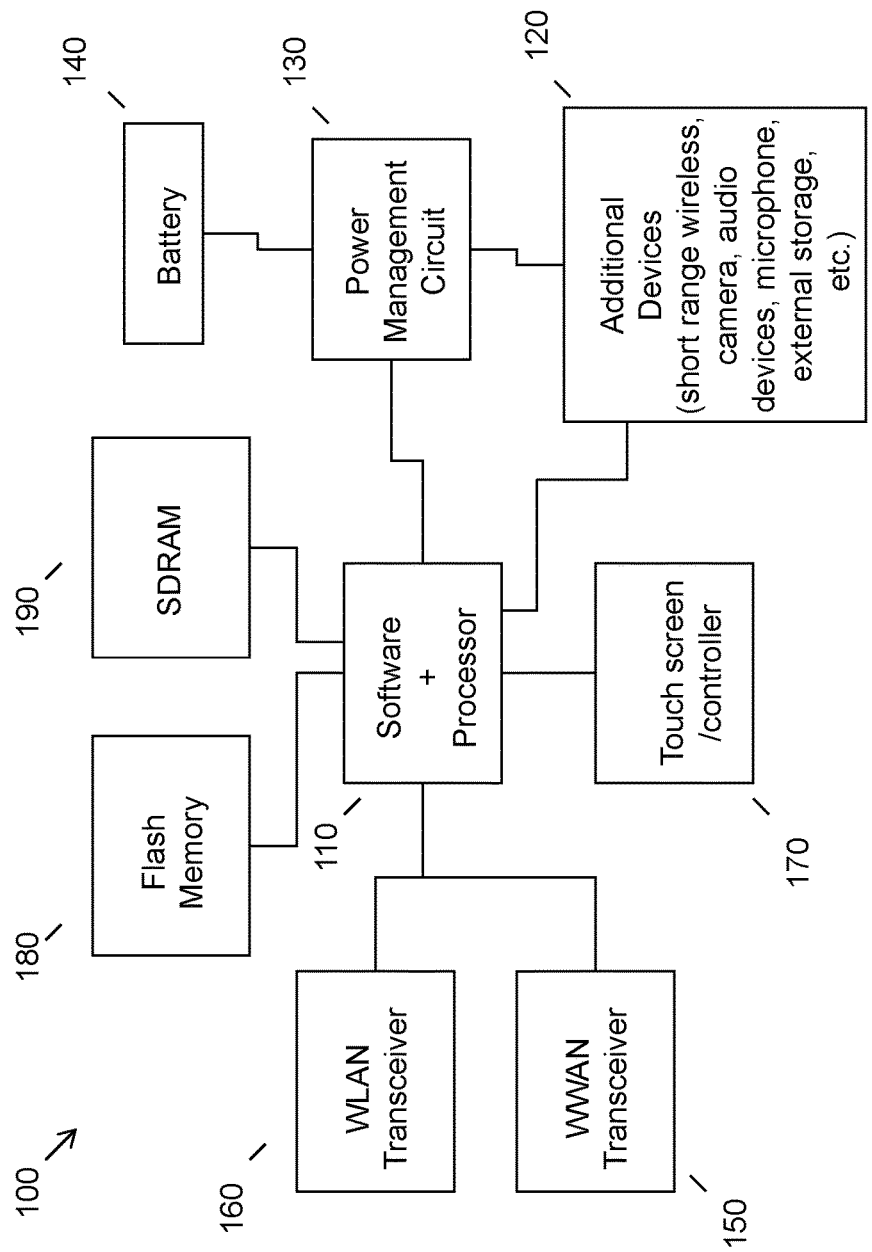
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices allow consumers of media to record and manipulate media that is being presented. For example, some consumers may record television shows on DVRs to be watched at a later, more convenient time. Consumers can also use other devices for recording media. For example, the consumer's television set may allow users to record media, the user may set up a system which records media on a consumer's information handling device (e.g., laptop, computer, tablet, etc.), and the like. Streaming media services allow a user to access media content at a time that is convenient for the user. Such media services generally allow a user to a select media for later consumption, for example, by putting the media on a favorites list, must watch list, putting the media in a queue, selecting media to be consumed later, and the like. Additionally, based upon past media selections, the streaming media service may generate media recommendations for the consumer. Also, other consumers may recommend media for a particular consumer.

However, when a consumer records media or adds media to a list for viewing later, it may be difficult to know or remember when everyone who wants to consume the media has consumed the media. For example, multiple people with access to the same recording device or streaming media service may want to consume the media, but all the users who want to consume the media may not be available to consume the media at the same time. Thus, one consumer may consume the media at one time and another consumer may consume the media at a later time. However, the consumers may not know if the other people who want to consume the media have consumed the media. Thus, consumers may not remove the media from the recording device or the streaming media service list.

By not removing the media, the device may reach its storage capacity or the streaming media service list may become cluttered and it may be difficult to find the media that the user wants to consume. The current solution is that the consumer has to ask the other people if they have consumed the media. Some recording devices may mark the media as being started or previously watched, for example, by changing the color of the title or by adding the last date and/or time accessed, but the consumer still does not know if everyone consumed the media or whether the other consumer has consumed the entirety of the media. Again, the consumers have to ask the other people for confirmation of whether the media can be removed from the device or list.

Accordingly, an embodiment provides a method of removing media based upon consumers who have been associated with the media consuming the media. In one embodiment, the association of the consumer to the media may be completed by a user. For example, a user may select a particular television show and designate which individuals or consumers would like to watch the show. In one embodiment, the association of the consumer to the media may be completed automatically by the system. For example, the system may identify a consumer who is consuming the media and may associate that consumer to similar media. As an example, if a consumer or multiple consumers are watching a first episode of a television show, an embodiment may associate all those consumers with the series or remaining episodes of the show.

Once the associated consumers have consumed the media, an embodiment may remove the media. In determining whether the consumers have consumed the media, an embodiment may provide a prompt to the users to designate which consumers who have been previously associated with the media are currently or have just consumed the media. As an example, when a consumer first starts viewing a video, the user may be presented with a prompt that requests that the consumer select the consumers who are going to be consuming the video. An embodiment may also be able to capture biometric data or data from a device of a user and determine which consumers are currently consuming the media. Once the system determines that all the consumers who are associated with the media have consumed the media, an embodiment may remove the media. Removing the media may include deleting the media from a device or removing the media from a list or queue within a streaming media service interface.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, biometric data capture device, etc. System 100 often includes a touch screen 170 for data input and display/rendering. System 100 also typically includes various memory devices, for example flash memory 180 and SDRAM 190.

Figure 2:
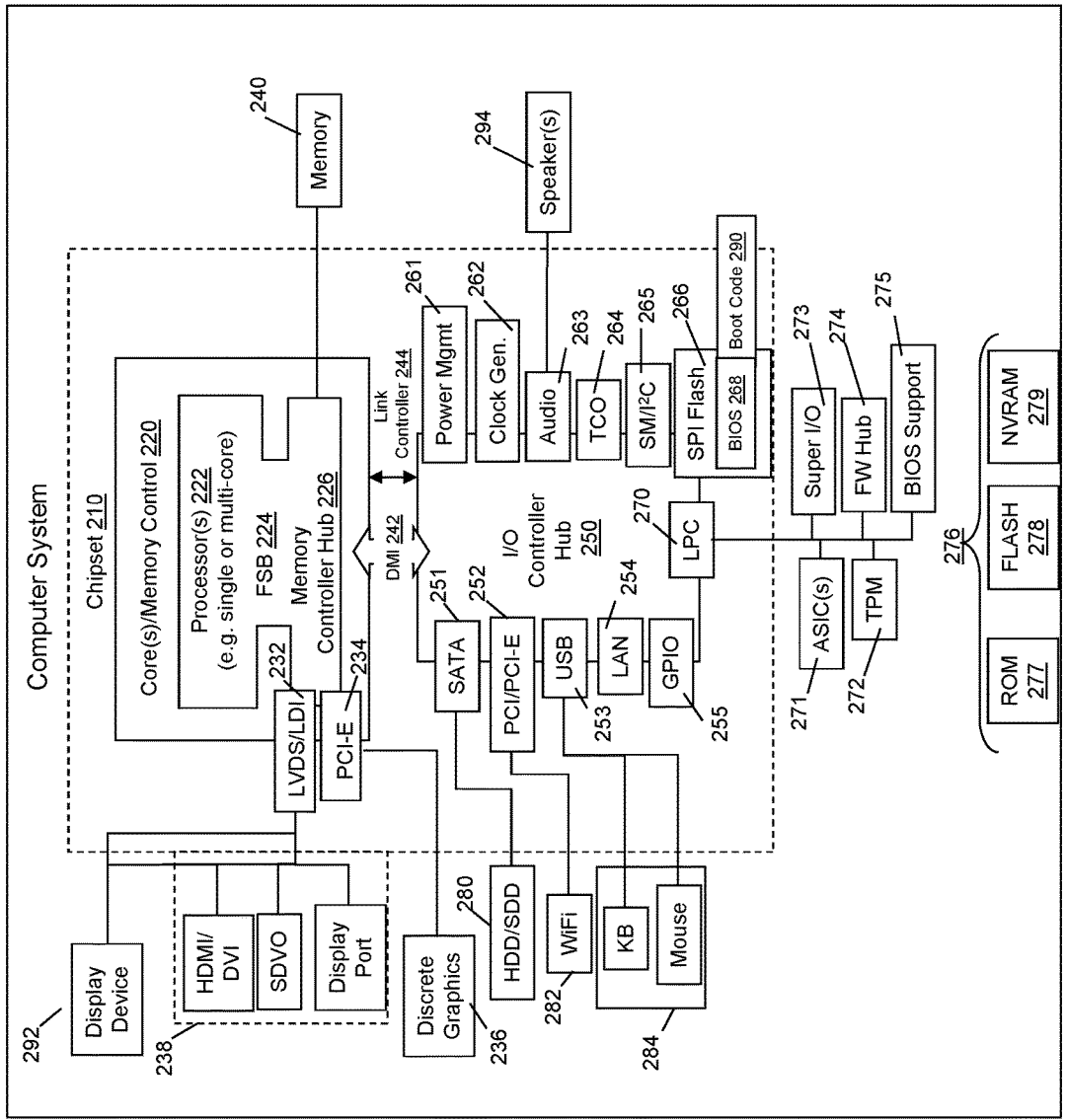
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to record or consume media. For example, the circuitry outlined in FIG. 1 may be implemented in a tablet or smart phone embodiment, whereas the circuitry outlined in FIG. 2 may be implemented in a personal computer embodiment.

Figure 3:
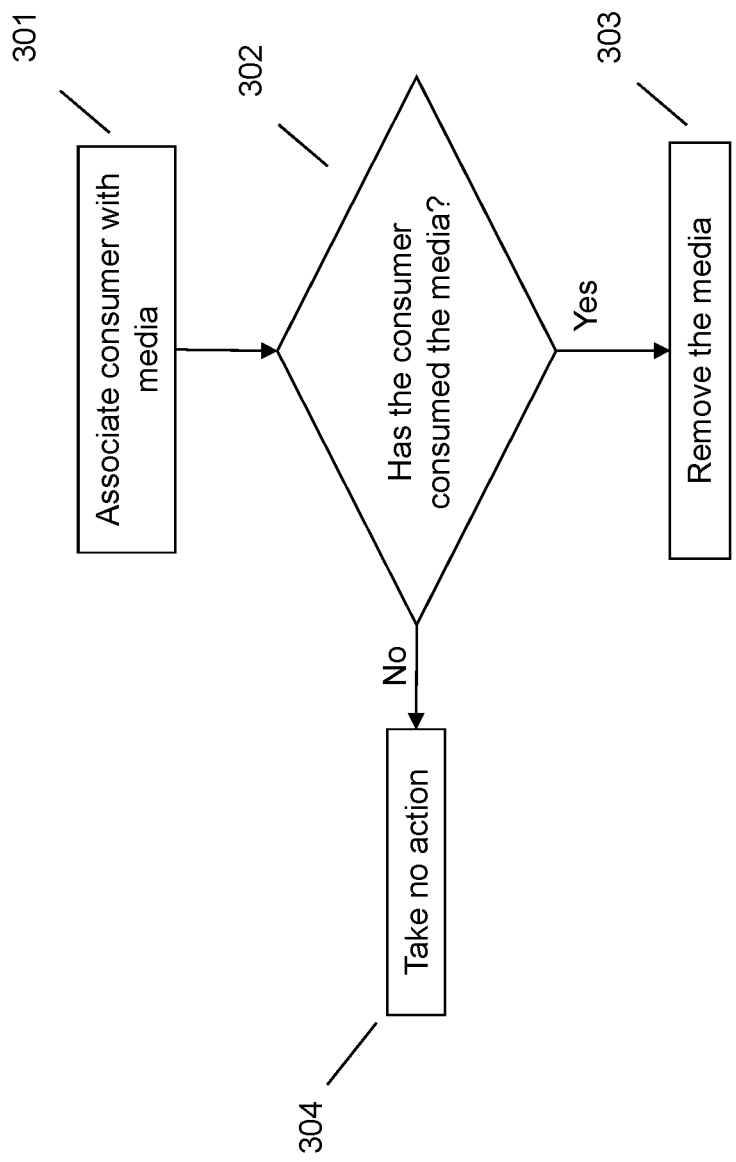
FIG. 3 illustrates an example method of media removal after consumption.

Referring now to FIG. 3, at 301, an embodiment may associate at least one consumer with identified media. In associating a consumer with the media, the system may add metadata to the media, media thumbnail, device data, or the like, that designates the consumers who are associated with the media. In one embodiment, the association may be based upon user input. In one embodiment, a user may provide identification of the consumers who want to consume the media. For example, a user may select particular media and then select the consumers who should be associated with the media. As an example, a user may select a television show or series and may then identify the consumers by selecting identification (e.g., name, profile, image, etc.) associated with the desired consumer from a list, providing input (e.g., typing a name, providing fingerprints, etc.) associated with the desired consumer, or the like. In one embodiment, the consumer may select a user profile and then select the media to be associated with the user profile. For example, if a child has a user profile and wants to consume all songs by a particular recording artist, the child may select their user profile and associate that recording artist with their profile. An embodiment may then associate the child with any songs or media by that artist.

In one embodiment, the association may be made automatically by the system. The system may identify consumers who have consumed particular media that may be similar or share a similar characteristic to the target media. For example, if a consumer has watched a first or second episode of a television series, the system may automatically associate the consumer with the remaining or future episodes of the television series. Characteristics may include people associated with the media (e.g., actor, director, artist, etc.), media title, media genre, air date or time, and the like. A user may also identify what characteristics should be used to identify whether media share similar characteristics.

Identifying the consumers may be based upon user input as discussed above. For example, a consumer may identify "Mom" as being associated with a second episode of a series. The system may then automatically associate "Mom" with the remaining or future episodes of the series. Alternatively, identifying the consumers may be completed by the system. In one embodiment, the system may use biometric data capture devices (e.g., cameras, fingerprint scanner, etc.) to identify the consumer. As an example, the system may identify that three consumers are consuming a particular media. The system may then use facial recognition to recognize the consumers and then map the biometric data to a known consumer. As an example, the biometric data may be mapped to a user identification or profile previously stored in the system. Alternatively, an embodiment may not directly identify the consumer, but may instead store the biometric information for later comparison. In other words, the system may not use the biometric data to specifically or particularly identify the user as "John." Rather, the system may store the data to be used for later comparison.

The system may also use other methods for identifying or associating the consumer with media. For example, the system may use data captured or obtained from an information handling device. Similar to the biometric data, an embodiment may capture data unique to a device to associate the consumer with the media. As an example, a consumer may have a smart phone which has a unique identifier. The system may capture the unique identifier and then associate that identifier with the consumer to identify the consumer, or may store the identifier for later comparison. The device may also send information to the system to assist the system in associating the consumer with the media. For example, the device may broadcast that it is "Jane's Phone" and the system may then associate "Jane" to the media. As another example, the device may identify the user profile which a consumer has used to log into or unlock the device with, and then transmit this information to the system.

Once the consumer or multiple consumers have been associated with the media at 301, an embodiment may determine whether all the consumers who have been associated with the media have consumed the media at 302. The determination of whether all the consumers associated with the media have all consumed the media, may be made using input provided by a user or may be made automatically by the system. In one embodiment, a user may be presented with a prompt requesting the user select or identify the consumers who are, will be, or have consumed the media. For example, an embodiment may provide a prompt when a consumer starts the media requesting the consumer select the consumers that have previously been associated with the media that are going to consume the media. The prompt may include a list of the consumers that have been associated with the media. The consumer may then select or mark which consumers will be consuming the media.

Alternatively, the prompt could be presented after the media has ended. As an example, if a consumer listens to a webcast, once the webcast has finished, the user may be presented with a prompt requesting the user the credentials or identification of the consumers who consumed the media. Providing the prompt at the conclusion of the media may assist in preventing consumers from being erroneously designated as having consumed the media. For example, if a consumer is prompted at the beginning of the media to select the consumers and a consumer is unable to complete the entirety of the media, the consumer may have to manually unselect the consumer.

The determination of whether all consumers associated with the media have consumed the media may be completed at least partially automatically by the system. In the same way that the system may capture biometric data or data from a device associated with a user to associate the consumer with the media, the system may capture similar data to determine which consumers are consuming the media. As an example, an embodiment may capture biometric data from the consumers consuming the media and compare that data to a user profile or previously captured biometric data. Alternatively, the biometric data may be used to identify the consumer and that consumer can then be marked as having consumed the media. Additionally, using such a method, the system may be able to determine whether the consumer was present for the duration of the media. For example, if a consumer leaves halfway through the media, the system may unmark or not mark that consumer as having consumed the media. The system may also place a bookmark associated with where the consumer left the media.

If the consumer did not consume the media, either because the consumer was not present at all, the consumer was only present for part of the media, or the consumer is not associated with the media, an embodiment may take no action at 304. In other words, an embodiment may not mark the consumer as having consumed the media. If, however, a consumer that is associated with the media and did consume the media at 302, an embodiment may remove the media at 303. Removing the media may include deleting the media from a device or removing the media from a list or queue associated with a streaming media service. Removing the media at 303 may be dependent on whether all consumers who are associated with the media have consumed the media. In other words, if there are two consumers associated with the media and only one consumer has consumed the media, an embodiment may only mark that consumer as having consumed the media. Additionally, the media may not be removed from the device or list in the streamlining media interface.

Before removing the media, an embodiment may provide a prompt or notification to a user. The prompt or notification may indicate to the consumer that the media is going to be removed. The prompt or notification may also allow the consumer to confirm whether the media should be removed or not. In other words, the prompt or notification may allow a user to provide input as to whether the media should be removed. Thus, a user may override the removal of the media. Overriding of the removal of the media may also be completed on a media by media basis. For example, a user may select particular media that should not or will not be removed even if all the consumers who have been associated with the media have consumed the media. For example, a child may have a favorite show that they like to watch over and over, so a parent may mark that show to never be removed.

In one embodiment, the removal of the media may be automatic. The system may remove the media without providing a prompt or notification to the consumer that the media is going to be removed. Whether the removal of the media requires user input or is automatic may be dependent on a user profile or settings. For example, one user may set the removal of the media to be automatic, while another user may set the removal of the media to require a prompt or notification before the removal. In one embodiment, removal of the media being automatic or providing a prompt may be based upon the media. For example, one television series may be automatic while another television series causes a prompt to be presented. As another example, removal of television shows may cause a prompt while removal of songs may be automatic.

As an alternative to removing the media, an embodiment may modify a characteristic associated with the media. A characteristic may include a color, an indicator bar, a thumbnail image, a font, and the like. As an example, if more than one consumer has been associated with the media, as each consumer consumes the media an indicator bar may be added or changed. For example, when one consumer consumes the media, a green indicator mark or bar may be added to the thumbnail of the media. When another of the consumers consumes the media, a red indicator mark or bar may be added to the thumbnail of the media. Thus, after both consumers have consumed the media, the thumbnail would include both a green and red indicator mark or bar. In such an example, the different indicators may be associated with a specific consumer. For example, Julie's indicator may always be green and Jamie's indicator may always be red. Other indicators are possible, for example, a tab may be added that indicates which consumers have consumed the media, the font of the title of the program may change, the information tab may be updated to indicate who has not consumed the media, and the like.

As an overall example of the system described herein, a household may have four people. Three of the people, Jack, June, and James, may like to watch a particular video series about cars. Using the methods described above, Jack, June, and James may be associated with the video series about cars. Jack may watch one of the episodes on Monday. Once Jack has watched the episode, the system designates Jack as having watched the episode. When June watches the episode on Wednesday, the system designates June as having watched the episode. Thus, the system now has both Jack and June designated as having watched the episode. After James watches the episode on Friday, the system removes the episode from the recording device or list for the streaming service, because now all three people who were associated with the episode have watched the episode.

An embodiment therefore represents a technical improvement for media management. An embodiment provides a method for associating consumers with media. After the consumers who have been associated with the media have consumed the media, an embodiment may remove the media. Thus, even if the consumers do not consume the media at the same time, the system can identify when the all of the consumers have consumed the media and remove the media.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    associating, using a processor, a plurality of identified consumers with identified media, wherein the associating comprises storing information corresponding to the identified media designating the plurality of identified consumers as being associated with the identified media;
    determining, using a processor, that at least one identified consumer of the plurality of identified consumers has consumed substantially the entirety of the identified media, wherein the determining comprises identifying that the at least one identified consumer was present for substantially the entirety of the identified media based at least in part on detection of a wireless identifier associated with the at least one identified consumer; and
    removing, after all of the plurality of identified consumers have consumed substantially the entirety of the identified media, the identified media, wherein the removing is based upon a rule set associated with the final identified consumer consuming the identified media.

2. The method of claim 1, wherein the associating comprises receiving user input identifying the at least one identified consumer.

3. The method of claim 2, wherein the user input comprises a user profile.

4. The method of claim 1, wherein the associating comprises identifying at least one consumer who has consumed media similar to the identified media.

5. The method of claim 1, wherein the determining comprises receiving user input indicating the at least one identified consumer has consumed the identified media.

6. The method of claim 1, wherein the determining comprises capturing biometric data associated with at least one consumer consuming the identified media and determining the at least one consumer is associated with the identified media.

7. The method of claim 1, wherein the determining comprises obtaining data from a device associated with at least one consumer consuming the identified media and determining the at least one consumer is associated with the identified media.

8. The method of claim 1, wherein the determining comprises providing a prompt requesting a user select consumers who have consumed the identified media.

9. The method of claim 1, wherein the determining comprises identifying that the at least one identified consumer was present for a duration of the identified media.

10. The method of claim 1, further comprising:
    providing a notification before removing the identified media; and
    receiving, in response to the notification, user input confirming removal of the identified media.

11. An information handling device, comprising:
    a processor;
    a memory device that stores instructions executable by the processor to:
    associate a plurality of identified consumers with identified media, wherein to associate comprises storing information corresponding to the identified media designating the a plurality of identified consumers as being associated with the identified media;
    determine that at least one identified consumer of the plurality of identified consumers has consumed substantially the entirety of the identified media, wherein to determine comprises identifying that the at least one identified consumer was present for substantially the entirety of the identified media based at least in part on detection of a wireless identifier associated with the at least one identified consumer; and
    remove, after all of the plurality of identified consumers have consumed substantially the entirety of the identified media, the identified media, wherein the removing is based upon a rule set associated with the final identified consumer consuming the identified media.

12. The information handling device of claim 11, wherein the instructions executable by the processor to associate comprise instructions executable by the processor to receive user input identifying the at least one identified consumer.

13. The information handling device of claim 12, wherein the user input comprises a user profile.

14. The information handling device of claim 11, wherein the instructions executable by the processor to associate comprise instructions executable by the processor to identify at least one consumer who has consumed media similar to the identified media.

15. The information handling device of claim 11, wherein the instructions executable by the processor to determine comprise instructions executable by the processor to receive user input indicating the at least one identified consumer has consumed the identified media.

16. The information handling device of claim 11, wherein the instructions executable by the processor to determine comprise instructions executable by the processor to capture biometric data associated with at least one consumer consuming the identified media and to determine the at least one consumer is associated with the identified media.

17. The information handling device of claim 11, wherein the instructions executable by the processor to determine comprise instructions executable by the processor to obtain data from a device associated with at least one consumer consuming the identified media and to determine the at least one consumer is associated with the identified media.

18. The information handling device of claim 11, wherein the instructions executable by the processor to determine comprise instructions executable by the processor to provide a prompt requesting a user select consumers who have consumed the identified media.

19. The information handling device of claim 11, wherein the instructions are further executable by the processor to:
provide a notification before removing the identified media; and
receive, in response to the notification, user input confirming removal of the identified media.

20. A product, comprising:
a non-signal storage device that stores code, the code being executable by a processor and comprising:
code that associates a plurality of identified consumers with identified media, wherein the code that associates comprises code that stores information corresponding to the identified media designating the a plurality of identified consumers;
code that determines that at least one identified consumer of the plurality of identified consumers has consumed substantially the entirety of the identified media, wherein the code that determines comprises code that identifies that the at least one identified consumer was present for substantially the entirety of the identified media based at least in part on detection of a wireless identifier associated with the at least one identified consumer; and
code that removes, after all of the plurality of identified consumers have consumed substantially the entirety of the identified media, the identified media, wherein the removing is based upon a rule set associated with the final identified consumer consuming the identified media.

21. An information handling device, comprising:
a processor;
a memory device that stores instructions executable by the processor to:
associate a plurality of identified consumers with identified media, wherein to associate comprises storing information corresponding to the identified media designating a plurality of identified consumers as being associated with the identified media;
determine at least one of the plurality of identified consumers has consumed substantially the entirety of the identified media, wherein to determine comprises identifying that the at least one identified consumer was present for substantially the entirety of the identified media based at least in part on detection of a wireless identifier associated with the at least one identified consumer; and
modify, based upon the at least one of the plurality of identified consumers consuming substantially the entirety of the identified media, a characteristic associated with the identified media, wherein the characteristic designates the identified media as having been consumed by the at least one of the plurality of identified consumers, wherein the modifying is based upon a rule set associated with the final identified consumer consuming the identified media.

* * * * *